(12) United States Patent
Strijker

(10) Patent No.: US 9,263,954 B2
(45) Date of Patent: Feb. 16, 2016

(54) SWITCHED MODE POWER SUPPLY

(75) Inventor: Joan Wichard Strijker, Wijchen (NL)

(73) Assignee: NXP B.V., Eindhoven (NL)

( * ) Notice: Subject to any disclaimer, the term of this patent is extended or adjusted under 35 U.S.C. 154(b) by 245 days.

(21) Appl. No.: 13/482,229

(22) Filed: May 29, 2012

(65) Prior Publication Data
US 2012/0327691 A1 Dec. 27, 2012

(30) Foreign Application Priority Data

Jun. 22, 2011 (EP) .................................. 11170999

(51) Int. Cl.
*H02M 3/335* (2006.01)
*H02M 1/32* (2007.01)
*H02M 1/00* (2007.01)

(52) U.S. Cl.
CPC ............ *H02M 3/33507* (2013.01); *H02M 1/32* (2013.01); *H02M 2001/0025* (2013.01)

(58) Field of Classification Search
None
See application file for complete search history.

(56) References Cited

U.S. PATENT DOCUMENTS

| | | | | |
|---|---|---|---|---|
| 5,754,415 A * | 5/1998 | Blackmon | ................... | 363/21.16 |
| 6,016,260 A * | 1/2000 | Heeringa | ................... | 363/21.18 |
| 6,292,376 B1 * | 9/2001 | Kato | ................ | H02M 3/33507 363/21.01 |
| 6,411,119 B1 | 6/2002 | Feldtkeller | | |
| 6,977,824 B1 * | 12/2005 | Yang et al. | ................. | 363/21.16 |
| 7,492,619 B2 * | 2/2009 | Ye et al. | ........................... | 363/97 |
| 7,667,987 B2 * | 2/2010 | Huynh et al. | ............... | 363/21.12 |
| 7,738,227 B2 | 6/2010 | Fang et al. | | |
| 7,869,229 B2 * | 1/2011 | Huynh et al. | ............... | 363/21.01 |
| 2004/0037098 A1 * | 2/2004 | Konno | ............................. | 363/49 |
| 2004/0070996 A1 * | 4/2004 | Carr | ........................... | 363/21.01 |
| 2005/0001597 A1 * | 1/2005 | Walters | .................... | H02J 1/102 323/222 |
| 2006/0152203 A1 * | 7/2006 | Perry et al. | ..................... | 323/283 |
| 2007/0041228 A1 | 2/2007 | Fang et al. | | |
| 2010/0002474 A1 * | 1/2010 | Moon et al. | ................. | 363/21.18 |
| 2010/0067260 A1 * | 3/2010 | Fitzgerald | ................... | 363/21.01 |
| 2010/0123447 A1 * | 5/2010 | Vecera et al. | .................. | 323/290 |
| 2010/0194463 A1 * | 8/2010 | Moon et al. | .................... | 327/427 |
| 2010/0321958 A1 * | 12/2010 | Brinlee et al. | ................ | 363/21.1 |
| 2011/0044076 A1 * | 2/2011 | Zhang et al. | ................ | 363/21.17 |

FOREIGN PATENT DOCUMENTS

| | | |
|---|---|---|
| CN | 1917322 A | 2/2007 |
| DE | 199 16 915 A1 | 10/2000 |
| WO | 02/31953 A1 | 4/2002 |

OTHER PUBLICATIONS

ON Semiconductor, datasheet NCP1380, "Quasi-Resonant Current-Mode Controller for High-Power Universal Off-Line Supplies", 26 pgs. (Dec. 2009).
NXP Semiconductors, application note AN10861 "GreenChip III TEA1752 integrated PFC and flyback controller", Rev. 01, 46 pgs. (Jul. 16, 2010).
Extended European Search Report for European Patent Appln. No. 11170999.4 (Nov. 14, 2011).

* cited by examiner

*Primary Examiner* — Timothy J Dole
*Assistant Examiner* — Monica Mata

(57) ABSTRACT

A power supply having over power protection based on the same signal as used by the feedback path for controlling the switching of the power supply is disclosed. This means that no additional signal needs to be supplied to the control circuit to implement mains over protection.

14 Claims, 8 Drawing Sheets

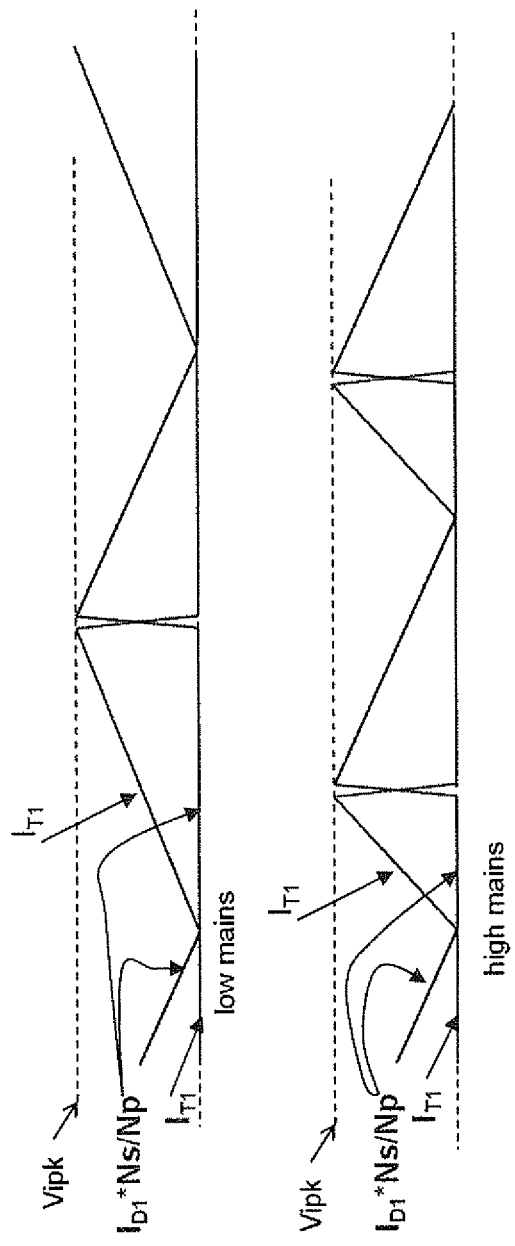
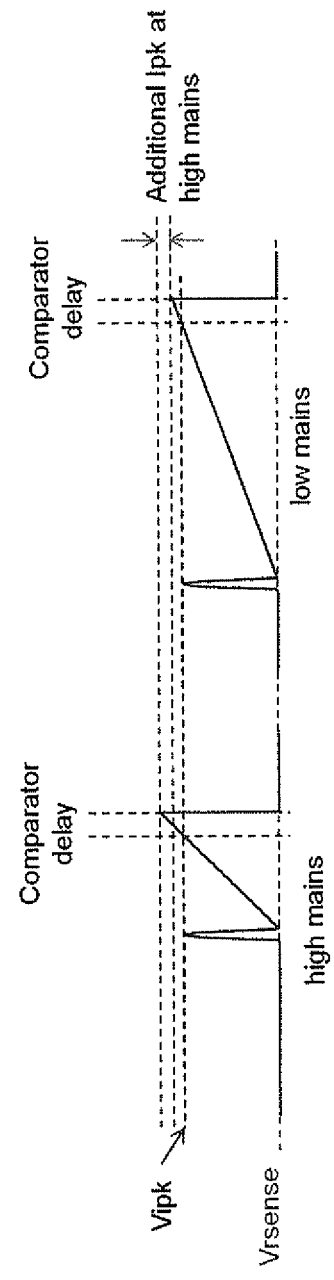
FIG. 2
FIG. 3

SWITCHED MODE POWER SUPPLY

CROSS-REFERENCE TO RELATED APPLICATIONS

This application claims the priority under 35 U.S.C. §119 of European patent application no. 11170999.4, filed on Jun. 22, 2011, the contents of which are incorporated by reference herein.

This invention relates to a switched mode power supply, and which enables compensation for the maximum output power variation caused by the mains input voltage.

Mains devices typically use switched mode power supplies to generate the required internal device voltages from the mains supply.

In mains connected flyback switched mode power supplies (SMPS), the output power is typically dependent on the mains input voltage. Typically the maximum output power increases with an increasing mains voltage. The output power increase can be caused by the mode of operation, e.g. quasi resonant operation, or by delays in the current detection circuits.

FIG. 1 shows a typical flyback SMPS.

The rectified mains 2 is supplied to the primary side of a transformer T1. The circuit is for example designed to accept voltages in the range 85 to 276V to enable use in different geographical areas. The diode rectifier D1 and capacitor provide a DC output.

The output voltage Vout is controlled by controlling the current in the primary circuit using the controllable switch S1. The current is measured as the voltage Visense across a sense resistor Rsense. The PWM circuit 10 adjusts the conduction time of the switch S1 to obtain a desired current value.

The PWM circuit 10 is an integrated circuit which comprises an oscillator 12 which provides the set signal to a set-reset latch 14, the output of which drives the switch S1 through a driver 15. The switch S1 is turned off when a peak current is detected. This peak current results in a voltage Visense which causes the output of a comparator 16 to switch output. The reference voltage provided to the comparator 16 is derived from a control unit 18 and comprises a voltage Vipk which represents the voltage to which the resistor Rsense is raised before switching needs to occur. Thus Vipk is the voltage across Rsense which corresponds to the desired peak current flow in the primary winding for the desired normal regulation current level.

The value of Vipk is derived from the feedback/control voltage, Vfb, which can be obtained from an error amplifier at the output.

A delay element 19 is used to delay an inverted version of the control signal to the switch S1 in order to generate a blanking signal "blank". This is used to blank the spike on Visense when switch S1 is switched on. As shown in FIG. 1, the blanking signal is used to disable the comparator, so that the comparator generates a low (i.e. no) output when the blank signal is high.

A quasi resonant flyback SMPS has a higher switching frequency at high mains compared to low mains. The time required to build up current through the transformer, T1, at high mains is smaller because dIpk/dt=Vmains/Lp in which Vmains is the rectified mains voltage, Lp is the primary self inductance of transformer T1 and dIpk/dt is the current build up through the transformer.

The output power is equal to Pout=½*Lp*Ipk²*Fsw, in which Ipk is the peak current through the transformer and Fsw is the switching frequency.

In FIG. 2 the transformer current, $I_{T1}$ and the output diode current, $I_{D1}$, are shown at high mains and at low mains.

The transistor current ramps up when the switch is closed. When the switch S1 is opened, no current flows in the primary winding, and the energy is transferred as a current through the diode D1. The peak of $I_{T1}$ is equal to the peak of $I_{D1}$, times the turn ratio of the transformer Ns/Np, in which Np is the number of primary side turns and Ns is the number of secondary side turns.

In a fixed frequency flyback SMPS, operating in discontinuous conduction mode, the output power is also Pout=½*Lp*Ipk²*Fsw.

Although Fsw is fixed and constant, the value of Ipk will typically be higher at high mains input voltages.

The comparator and also the driver circuit will have some delay. As the peak current increase at high mains is faster than at low mains, dIpk/dt=Vmains/Lp, the delay will cause a higher peak current level at high mains compared to low mains.

This is shown in FIG. 3, which shows the ramping of voltage Visense in time with the ramp of $I_{T1}$ When the voltage Vipk is reached, there is a constant delay "comparator delay" before the switch turns off and brings the current $I_{T1}$ back to zero and accordingly Visense back to zero.

For thermal and safety reasons, it is desired in many applications that the maximum output power is the same at high mains and low mains voltages.

To compensate for the output power variations, the mains input voltage can be measure and a compensating signal can be introduced. WO02/31953 discloses a switched mode power supply in which the mains input voltage (line voltage) is measured using a third transformer winding.

The need to monitor the mains voltage level requires an extra signal to be processed by the controller, and this adds to the circuit complexity and the number of signal connections to be made.

According to the invention, there is provided a switched mode power supply comprising:

an input for connection to a rectified mains supply, a transformer having a primary winding on the mains side and a secondary winding on the dc output side;

a switching element for controlling the current flow in the primary winding of the transformer;

a sense resistor in series with the switching element;

a feedback control system for controlling the switching element in dependence on a sense voltage which is dependent on the sense resistor, wherein the feedback control system is part of an integrated circuit, and the transformer is outside the integrated circuit, wherein the integrated circuit further comprises a detection arrangement (40) for converting a rate of change of the sense voltage into a voltage level, and thereby derive a voltage signal (Vipk_max) representing the mains voltage.

The invention provides a new way of deriving the mains voltage level based on the rate of change of a sense voltage, which is already used as part of the feedback control system. This means that additional signals do not need to be used.

In one arrangement, the switching element and the sense resistor are outside the integrated circuit and the sense voltage is provided to a sense pin of the integrated circuit.

This arrangement re-uses the pin that is used for current sensing to derive a signal giving an indication of the main supply voltage. In previous integrated circuits, measuring the mains voltage typically requires an input pin for receiving the signal representing the mains voltage. For integrated circuits this may become an issue if the number of pins is limited.

The invention can be used to provide a constant power for different mains voltage levels. A detection arrangement is used for detecting the mains level based on the signal on the pin used to measure the voltage change on the sense resistor.

The detection arrangement can comprise a capacitor and a circuit to measure the current through the capacitor. In response, the circuit adjusts the maximum current level through the switching element in dependence on the current through the capacitor.

Preferably, the feedback control system comprises a comparator for comparing the sense voltage with a reference voltage and controlling a set-reset latch dependent on the comparison.

In one example, the detection arrangement comprises a capacitor connected to the sense voltage, and a current mirror circuit which copies the current through the capacitor to a detection resistor. The current through the capacitor is proportional to the rate of change of voltage, which in turn is dependent on the level of the mains input voltage.

The voltage across the detection resistor thus comprises a detector voltage which is used as a measure of the mains voltage.

The comparator reference voltage can be derived from the detector voltage, so that the mains voltage becomes a control parameter in the feedback loop, for example in order to provide constant output power.

A selection unit can be provided which selects, as the comparator reference voltage, one of (such as the minimum of) the detector voltage and a voltage corresponding to the normal regulation current level.

In another example, a compensation resistor is provided between a terminal of the sense resistor and the sense voltage. This can be outside the integrated circuit so that it can be changed to alter the circuit performance.

It is used to create a variable voltage drop in the feedback control loop, which alters the timing at which the switch is turned off. In this way, a larger mains voltage will result in earlier switching off of the transformer primary winding.

The detection arrangement then can comprise a capacitor connected to the sense voltage, a sample and hold circuit for sampling a voltage on one of the capacitor terminals, and a voltage to current converter circuit for driving a current through the compensation resistor.

This sampling operation is used to periodically update the circuit to follow changes in the mains voltage level.

The feedback control system can then comprise a second comparator, wherein the comparator and the second comparator are for comparing the sense voltage with respective reference voltages, wherein a set-reset latch is provided which receives the two comparator outputs and which generates the sample signal for the sample and hold circuit. This provides a mechanism for controlling the timing of the sampling process.

The invention also provides a method of controlling a switched mode power supply, comprising:
 transforming a mains supply input to a dc output;
 controlling the coupling of the current flow in the primary winding of the transformer to a sense resistor using a switching element;
 controlling the switching element in dependence on the current flowing using a feedback control system which is part of an integrated circuit and which receives a sense resistor voltage,
 wherein the method further comprises converting a rate of change of the sense voltage into a voltage level, and thereby deriving a voltage signal representing the mains voltage.

Examples of the invention will now be described in detail with reference to the accompanying drawings, in which:

FIGS. 2 and 3 are timing diagrams to show the operation of the circuit of FIG. 1;

The invention provides a power supply in which over power protection is provided based on the same signal as used by the feedback path for controlling the switching of the power supply. This means that no additional signal needs to be supplied to the control circuit to implement mains over protection.

For example, current solutions use an additional pin for over power protection (OPP). The mains input voltage is detected via the transformer using an auxiliary winding. The voltage is then measured via a resistive divider on the dedicated pin. The dedicated pin is internally connected to an over power protection circuit that limits the peak current through the sense resistor Rsense, as measured via a separate sensing pin.

The invention enables the same signal and the same pin to be used for current sensing as for mains input voltage detection. The current sensing is carried out as in previous solutions, by measuring the voltage across a resistor Rsense. The mains input voltage sensing is however carried out by measuring the rate of change of voltage (dV/dt) on the current sense resistor. No additional pin is required.

Figure 4:
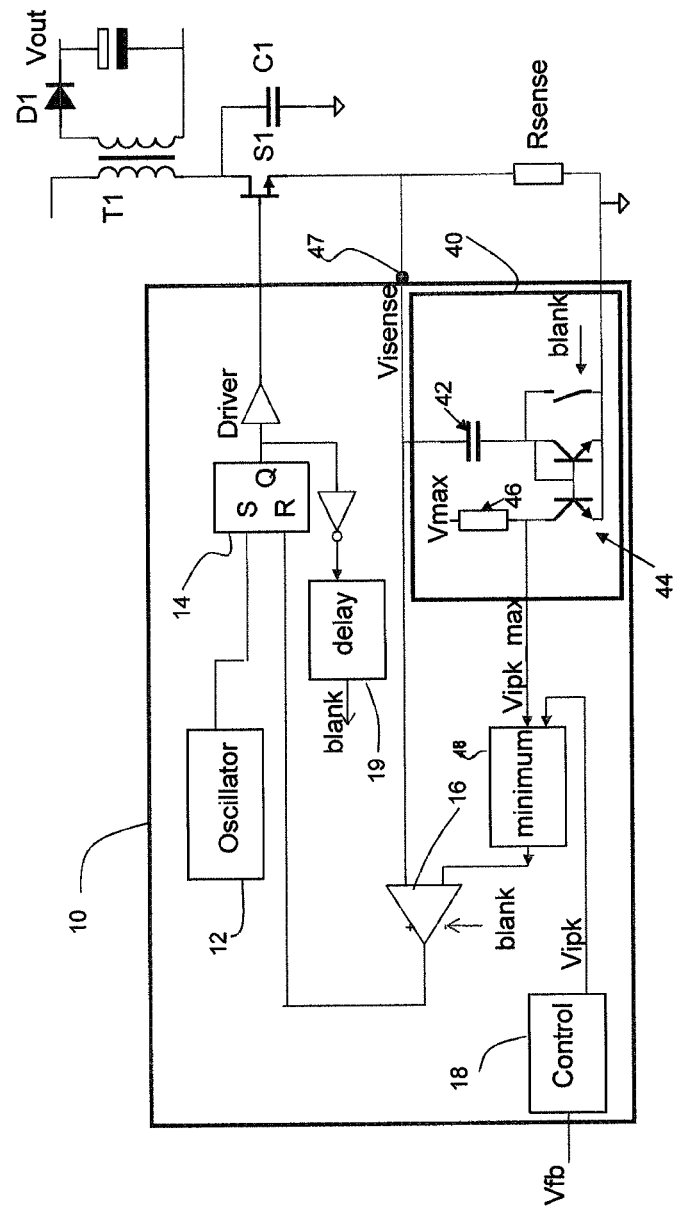
FIG. 4 shows a first example of switched mode power supply of the invention.

A first example of circuit of the invention is shown in FIG. 4.

The circuit elements in the area 40 implement the sensing approach of the invention.

When the switch S1 is turned on, the voltage across the transformer winding varies as V=Ldi/dt. The constant rate of change of current di/dt through the transformer winding (as shown in FIG. 2), as the current builds up, is proportional to the mains voltage level V and it is translated into a constant voltage change dV/dt at the sense pin (since the voltage follows the current proportionally with Vsense=I·Rense). The magnitude of the voltage change dV/dt across the resistor is thus proportional to the mains voltage because the rate of change of current is proportional to the mains voltage level.

It is noted that the voltage across the inductor is almost the entire voltage since the sense resistor has a small value and the voltages processed by the feedback circuit are very small compared to the mains voltage level.

A capacitor 42 is used to detect the rate of change of voltage dV/dt across the sense resistor Rsense. The current through capacitor 42 is $I=C_{42}*dV/dt$.

For a constant mains input voltage, this is a constant current value for a chosen application.

The current is mirrored (with a scaling which may be 1 but does not have to be) by a current mirror circuit 44 for the correct polarity of the compensation required.

An output resistor 46 converts the current into a voltage. $Vipk\_max = Vmax - I*R_{46}$.

Figure 1:
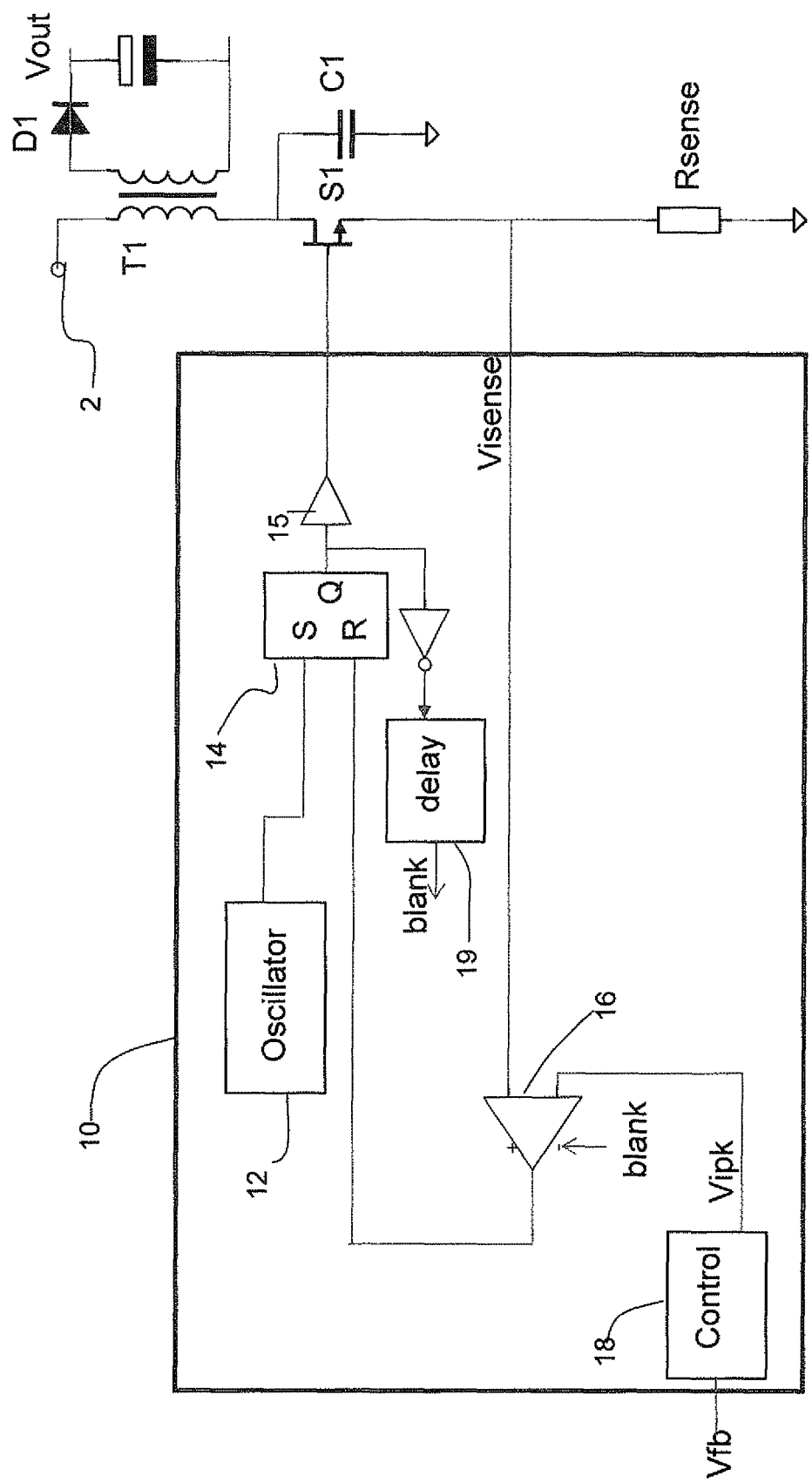
FIG. 1 shows a known switched mode power supply.

The circuit thus carries out multiple conversions:

it converts the constant slope of the transformer winding current into a constant rate of change of voltage on the sense resistor (this is already carried out by the sense resistor in FIG. 1);

it converts the constant rate of change of voltage into a constant current using the capacitor 42;

it converts the constant capacitor current into a constant voltage, using the resistor 46.

In this way, the circuit of the invention takes a signal to a sense pin 47, which comprises a voltage that has no direct relationship to the mains line voltage, and converts this into a signal which is a measure of the line voltage. The integrated circuit boundary is again at the edge of the PWM circuit 10.

The reference voltage provided to the comparator 16 is the minimum of Vipk_max and Vipk, and this minimum is derived by the unit 48.

This means that while no over power situation has been detected, the feedback system works in exactly the same way as in FIG. 1.

If an over power situation is detected, the constant capacitor current through capacitor 42 will increase, and the voltage at the base of resistor 46 will drop. When the voltage drops below the value Vipk, the feedback system is made to switch off the switch S1 earlier than would be the case for the normal feedback system. Thus, over power protection is implemented.

The remaining components of the circuit are the same as in FIG. 1. As in the circuit of FIG. 1, Vipk is the sense resistor voltage corresponding to the normal regulation current level, and is derived from the feedback/control voltage, Vfb. The feedback/control voltage input has a dedicated pin.

Figure 5:
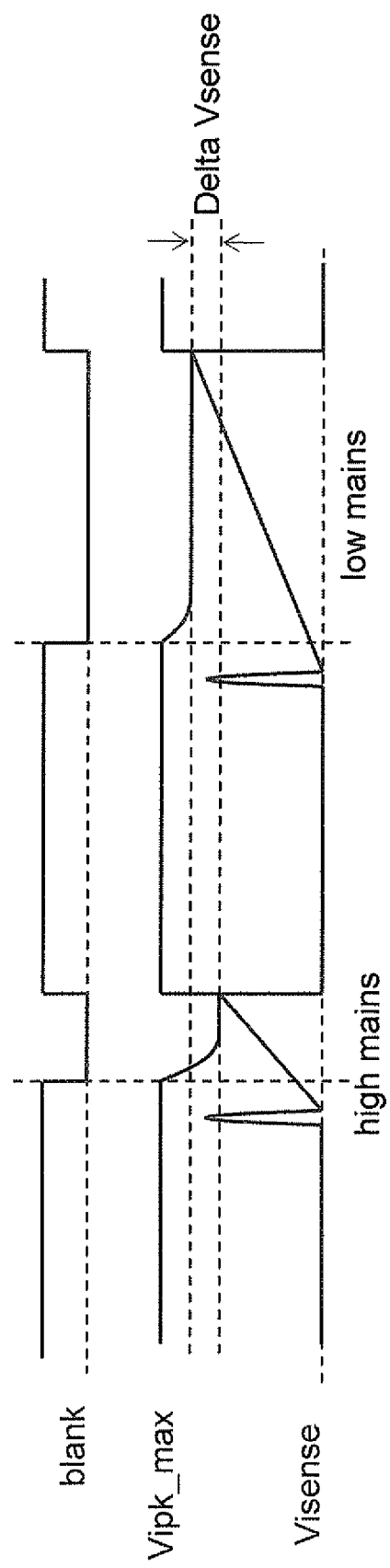
FIG. 5 is a timing diagram to show the operation of the circuit of FIG. 4.

In FIG. 5 the signals "Vipk_max", "Visense" and "blank" are drawn for a high mains voltage and for a low mains voltage.

At a high mains voltage the rate of change of voltage dV/dt on Visense is larger than at low mains so that Vipk_max is a lower voltage. The peak voltage on Visense thus is now lower at high mains voltages compared to low mains (Delta Vsense). As shown, this is because at high mains voltages, the signal Vipk_max drops to a lower level, and if it is the factor which makes the feedback loop switch the switch S1 off, this will be at a lower voltage of Visense.

FIG. 5 shows both situations with switching when Visense reaches Vipk_max. Of course, it may be that no over power protection is needed, in which case the signal Vipk (not shown in FIG. 5) will control the switching in conventional manner.

The shape of the plot Vipk_max will cancel the effects that increase the output power.

As mentioned above, the blanking signal also shown in FIG. 5 is typically needed to blank the spike on Visense when switch S1 is switched on. This spike is from the discharge of C1 through S1 and Rsense when S1 is switched on.

C1 can be a real capacitor in the application or a stray capacitor.

The blanking signal is used in FIG. 4 to prevent incorrect signals at the moment S1 is switched on.

The embodiment in FIG. 4 provides a fixed compensation if the circuit is an integrated circuit, because the values of the capacitor 42 and resistor 46 cannot be adjusted in an application.

Figure 6:
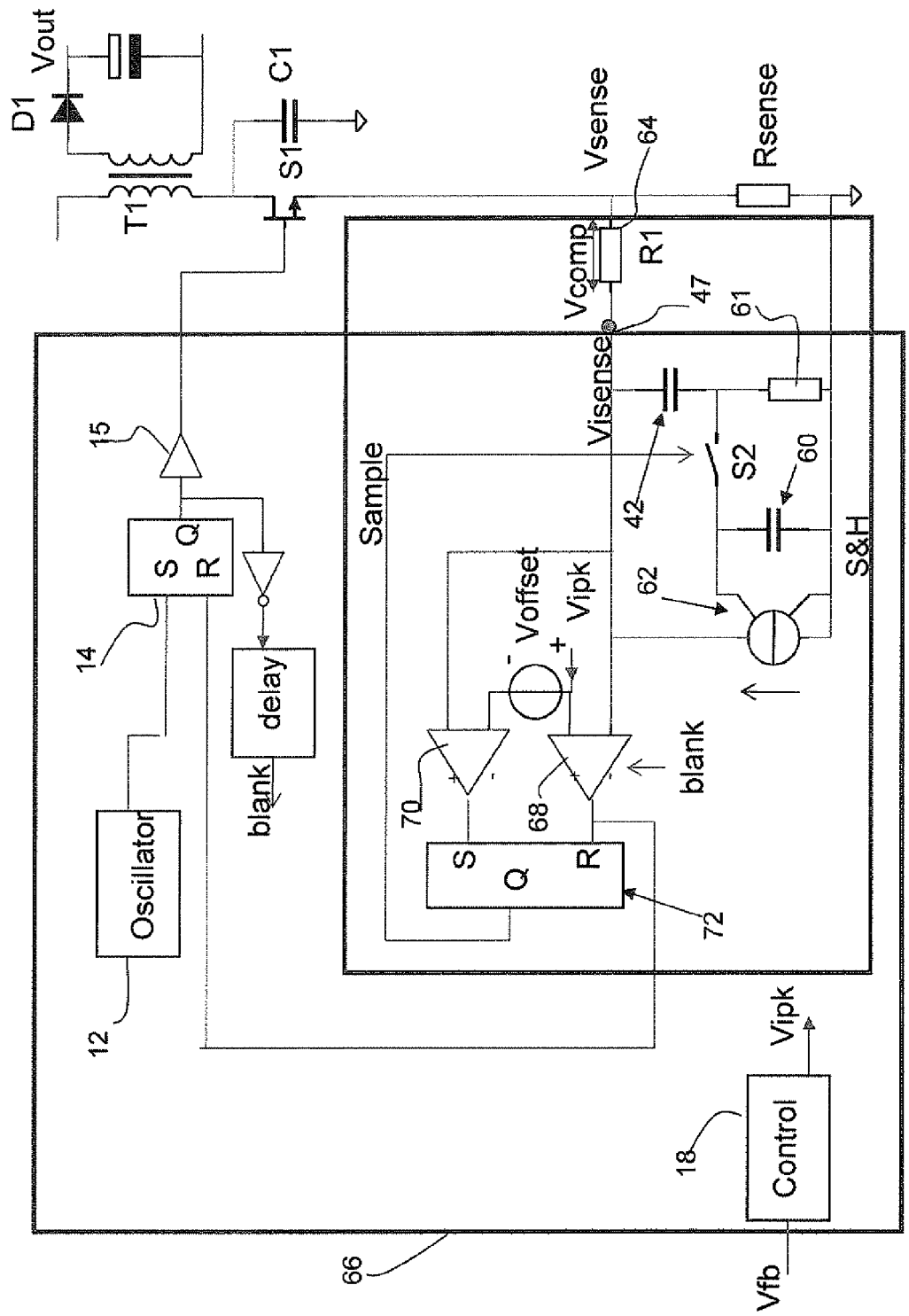
FIG. 6 shows a second example of switched mode power supply of the invention.

In FIG. 6 a more advanced embodiment is shown.

The conversion process is the same, namely the constant slope of the transformer winding current is converted to a constant rate of change of voltage on the sense resistor, then into a constant current using the capacitor 42 and into a constant voltage. However, the mechanism for altering the feedback control loop is different and uses a resistor with a controllable voltage in the loop.

In FIG. 6 the constant current resulting from the rate of change of voltage dV/dt of the sense voltage Visense is measured and stored as a voltage on a sample and hold capacitor 60.

The current flows to the capacitor 42 as in the example of FIG. 4 and a voltage is generated across a sample and hold resistor 61.

A voltage to current converter 62 converts the voltage on the sample and hold capacitor 60 to a dc current by driving the voltage through a series resistor 64 (since no current flows to the input of the comparators).

At a sampling instant, the voltage between the capacitor 42 and resistor 61 is switched to the converter 62 (and held by capacitor 60).

The series resistor 64 means that the sense voltage Visense in this case is not the voltage on the sense resistor Rsense, as there is a compensation voltage drop Vcomp across the series resistor 64.

The sense resistor is much smaller than the resistor 64. For example, the sense resistor may be of the order of 100 mΩ whereas the resistor 64 can be of the order of 10 kΩ. The rate of change of voltage dV/dt at the sense resistor (Vsense) is mapped to the same rate of change of voltage dV/dt on capacitor 42, as the constant capacitor current gives a constant voltage drop across resistor 64.

The additional current generated by the converter 62 alters the voltage drop across the resistor 64, so that it is dependent on the mains voltage level. In this way, the feedback control path is altered based on the mains voltage, again by changing the level of the input to the comparator 68 which generates the Reset input to the set-reset latch 14.

The series resistor 64 is external to the integrated circuit, which is shown as boundary 66. By adjusting the value of resistor 64, the compensation can be chosen dependent on the application, since the value of resistor 64 will vary the step voltage change resulting from different mains voltage levels.

This approach does not change the power capability of the circuit, since the resistor Rsense is not changed.

The comparator 68 performs the same function as the comparator 16 in FIG. 1 and it receives the values Vipk and Visense (although with a step applied as a function of the mains voltage).

The sample and hold function, which controls the current generated by the converter 62, is driven by the comparator 68, a second comparator 70 and the set-reset flip-flop 72.

The two comparators 68 and 70 and flip flop 72 essentially perform a pulse generation function, which could be implemented by many other circuits.

The second comparator 70 has a slightly different reference level/timing than comparator 68. The difference is made by an offset voltage Voffset. In another implementation, the sampling moments can be at different times on the slope of the Visense signal, but only after the blanking time because the sense signal does not have a voltage slope which relates to the mains input voltage when the signal needs to be blanked.

The output of the set reset flip flop 72 controls the sampling function.

Figure 7:
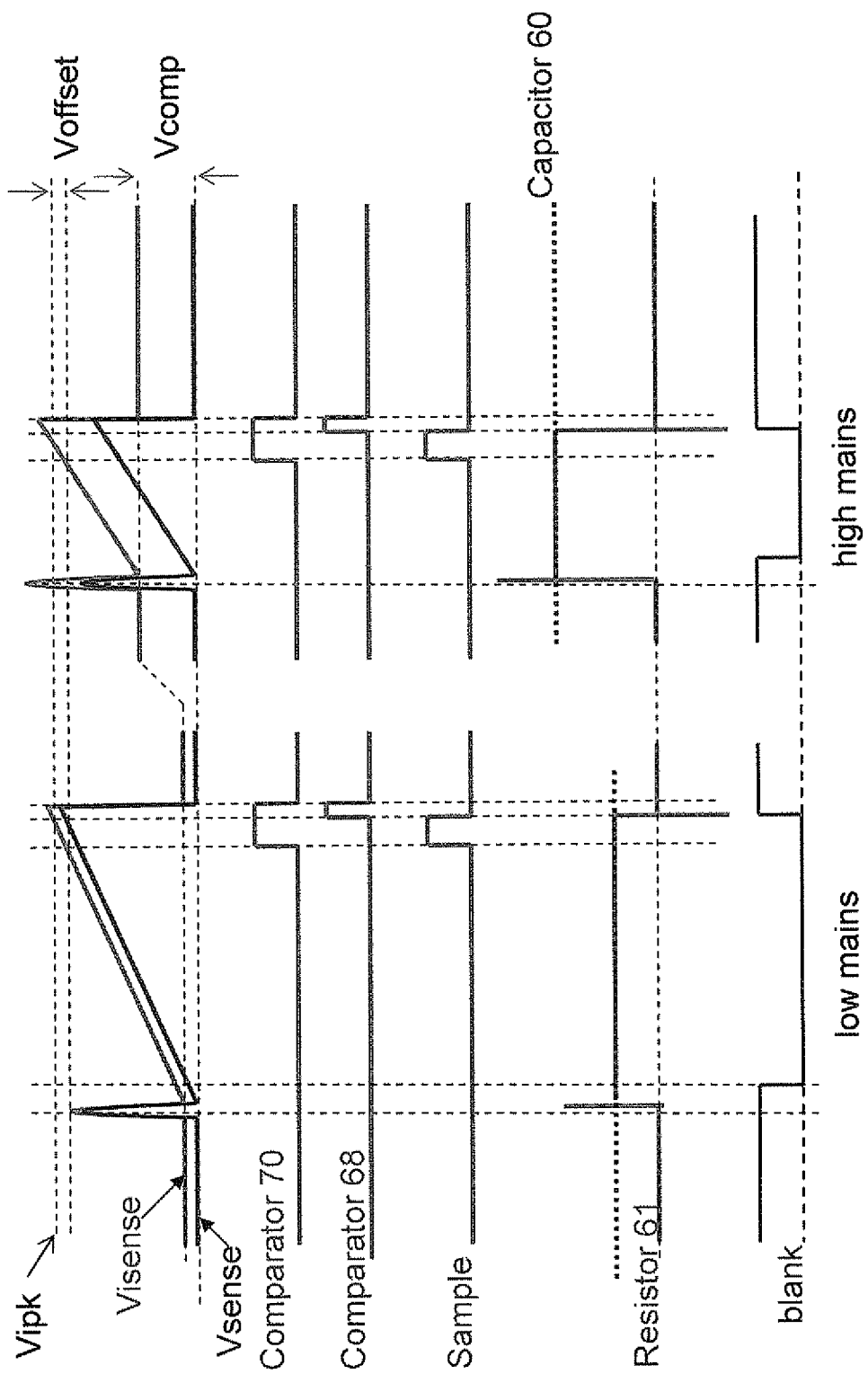
FIG. 7 is a timing diagram to show the operation of the circuit of FIG. 6.

In FIG. 7 the relevant signals are shown for low mains and high mains.

Between the sampling instants, the voltage to current driver delivers a constant current, as the voltage held on the capacitor 60 remains constant over this time. Periodically, the voltage on the capacitor 60 is updated, so that it follows changes in the mains voltage.

As explained above, the sense voltage Visense has an offset, Vcomp, with respect to the voltage on the sense resistor, Vsense. At high mains the compensation voltage is larger. This will lower the peak current through the sense resistor because the comparator 68 will toggle earlier (Visense reaches Vipk earlier) which then compensates for the effects that increase the output power.

In the examples of FIG. 4 and FIG. 6, the switch S1 and resistor Rsense are outside the integrated circuit. However, the sense resistor and/or the switch can be inside the integrated circuit, and the invention maintains the advantage of enabling a single signal to be used for multiple control purposes.

Figure 8:
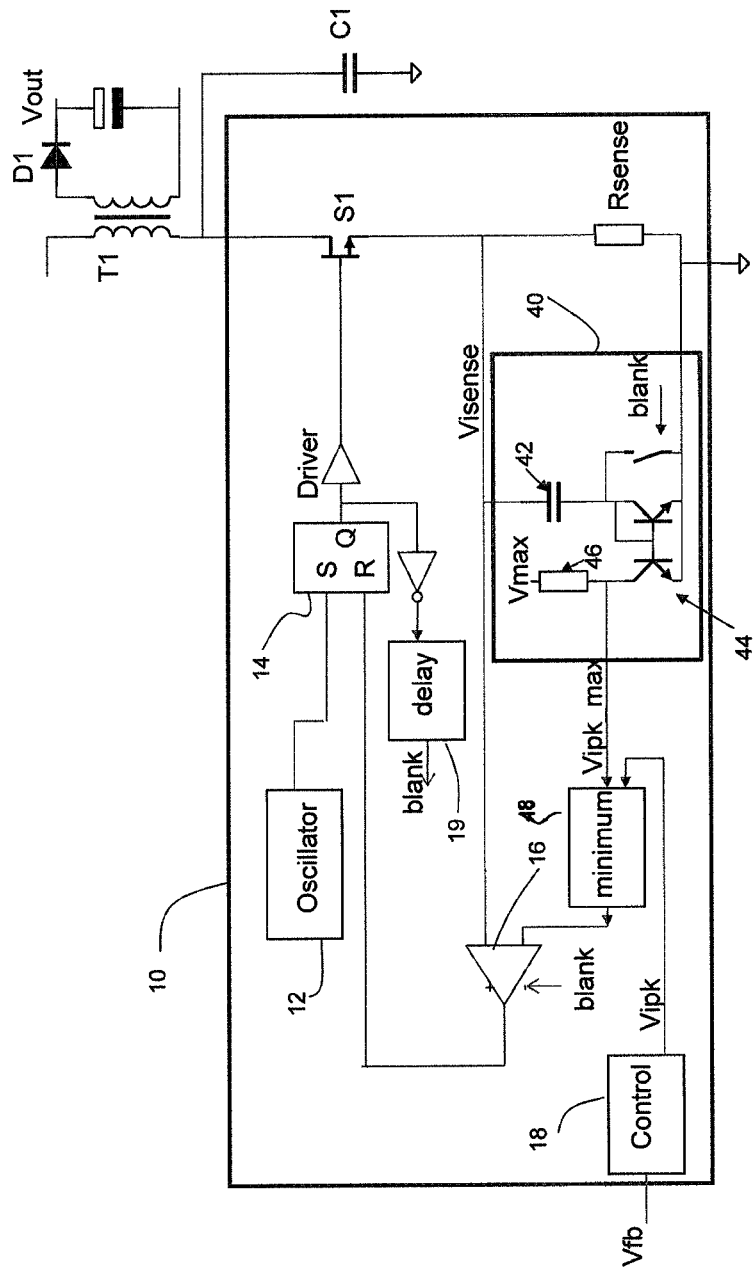
FIG. 8 shows a third example of switched mode power supply of the invention as a minor modification to the example of FIG. 4.
Figure 9:
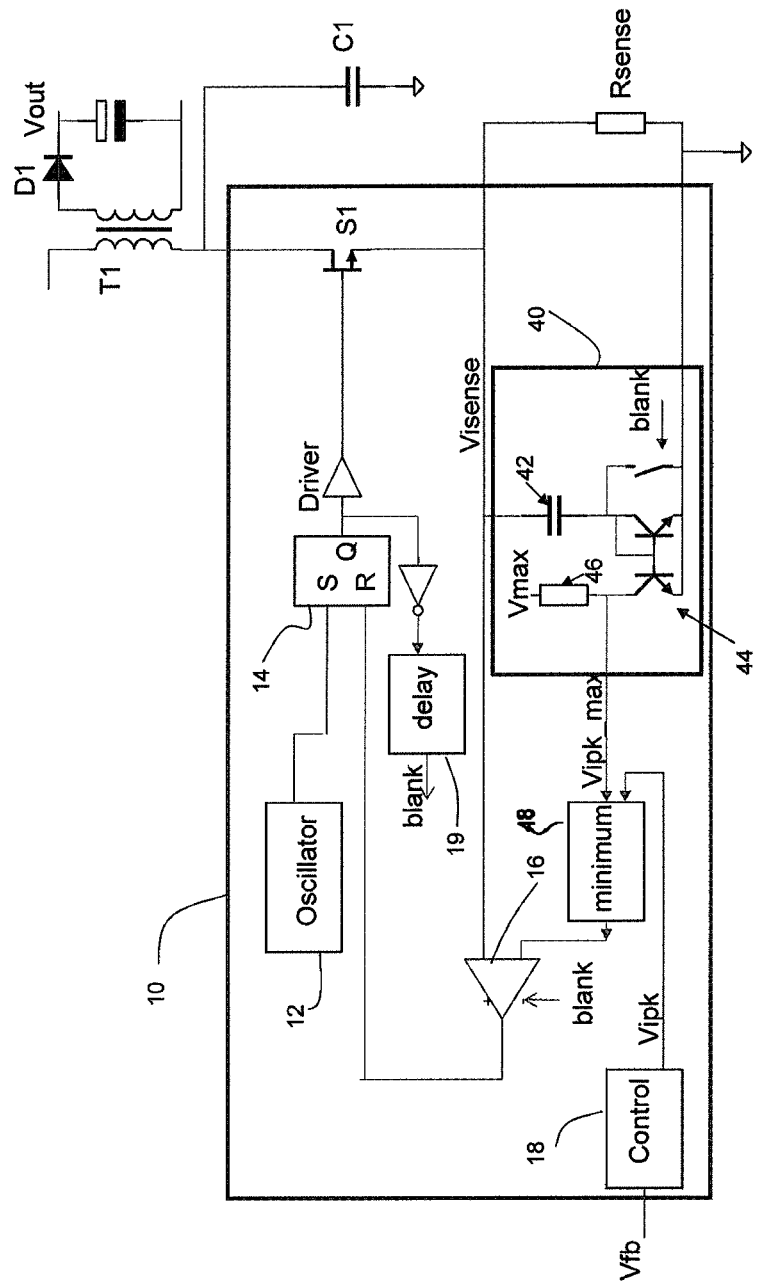
FIG. 9 shows a fourth example of switched mode power supply of the invention as another minor modification to the example of FIG. 4.

FIG. 8 shows a modification to FIG. 4 in which the sense resistor Rsense and the switch S1 are part of the PWM integrated circuit 10. FIG. 9 shows a modification to FIG. 4 in which the switch S1 is part of the PWM integrated circuit 10 and the sense resistor Rsense is outside the integrated circuit.

Various examples of circuit have been given but others are possible. The invention takes the existing Vsense signal and processes this to derive a signal which represents the mains voltage level. This can then be used in various ways to alter the feedback control to provide over power protection.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. A switched mode power supply comprising:
    an input for connection to a rectified mains supply,
    a transformer having a primary winding on a mains side and a secondary winding on a dc output side;
    a switching element for controlling current flow in the primary winding of the transformer;
    a sense resistor in series with the switching element;
    a feedback control system for controlling the switching element dependent on a sense voltage, which is dependent on the sense resistor,
    wherein the feedback control system is part of an integrated circuit, and the transformer is outside the integrated circuit, and
    wherein the integrated circuit further comprises a detection arrangement for converting a rate of change of the sense voltage into a constant current using a capacitor and converting the constant current into a constant voltage level using a resistor, thereby deriving a voltage signal representing the mains voltage, wherein the feedback control system comprises a first comparator and a second comparator, wherein the first comparator and the second comparator are for comparing the sense voltage with respective reference voltages to generate two comparator outputs, wherein the first comparator is for comparing the sense voltage with a first reference voltage to generate a first comparator output signal and inputting the first comparator output signal into a reset input of a first set-reset latch to control the first set-reset latch, wherein a second set-reset latch is provided which receives the two comparator outputs generated by the first and second comparators and which generates a sample signal for a sample and hold circuit.

2. A power supply as claimed in claim 1, wherein the switching element and the sense resistor are outside the integrated circuit and the sense voltage is provided to a sense pin of the integrated circuit.

3. A power supply as claimed in claim 1, wherein the detection arrangement comprises a capacitor connected to the sense voltage, and a current mirror circuit which copies the current through the capacitor to a detection resistor, wherein the voltage across the detection resistor comprises a detector voltage which is used as a measure of the mains voltage.

4. A power supply as claimed in claim 3, wherein a comparator reference voltage is derived from the detector voltage.

5. A power supply as claimed in claim 4, further comprising a selection unit which selects, as the comparator reference voltage, one of either the detector voltage or a voltage corresponding to the normal regulation current level.

6. A power supply as claimed in claim 1, further comprising a compensation resistor between a terminal of the sense resistor and the sense voltage.

7. A power supply as claimed in claim 6, wherein the detection arrangement comprises a capacitor connected to the sense voltage, the sample and hold circuit for sampling a voltage dependent on a current through the capacitor, and a voltage to current converter circuit for driving a current through the compensation resistor.

8. A power supply as claimed in claim 1, wherein a pin in the detection arrangement is configured to sense current and to detect mains input voltage.

9. A power supply as claimed in claim 1, wherein the first comparator is configured to input the first comparator output signal into a reset input of the second set-reset latch to control the second set-reset latch.

10. A method of controlling a switched mode power supply, comprising:
    transforming a mains supply input to a dc output;
    controlling coupling of a current flow in a primary winding of the transformer to a sense resistor using a switching element;
    controlling the switching element depending on the current flowing, using a feedback control system which is part of an integrated circuit and which receives a sense resistor voltage, and
    converting a rate of change of the sense voltage into a constant current using a capacitor and converting the constant current into a constant voltage level using a resistor, thereby deriving a voltage signal representing the mains voltage,
    wherein controlling the switching element comprises comparing the sense voltage with respective reference voltages to generate two comparator outputs using a first comparator and a second comparator, wherein comparing the sense voltage with the respective reference voltages comprises comparing the sense voltage with a first reference voltage to generate a first comparator output signal, and wherein controlling the switching element further comprises inputting the first comparator output signal into a reset input of a first set-reset latch to control the first set-reset latch and inputting the two comparator outputs generated by the first and second comparators into a second set-reset latch to generate a sample signal.

11. A method as claimed in claim 10, wherein the step of converting the rate of change of the sense voltage comprises providing the sense voltage to a capacitor and copying the current through the capacitor to a detection resistor to derive a detector voltage which is used as a measure of the mains voltage.

12. A method as claimed in claim 11, further comprising selecting, as a comparator reference voltage, one of the detector voltage and a voltage corresponding to the normal regulation current level.

13. A method as claimed in claim 12, wherein the step of converting the rate of change of the sense voltage comprises providing the sense voltage to a capacitor and sampling a voltage dependent on a current through the capacitor, and driving a current through a compensation resistor based on the sampled voltage, thereby controlling a voltage drop between a terminal of the sense resistor and a sense pin.

14. A method as claimed in claim 10, further comprising using the voltage signal representing the mains voltage to provide over power protection.

* * * * *